(12) United States Patent
Shimizu

(10) Patent No.: US 7,584,673 B2
(45) Date of Patent: Sep. 8, 2009

(54) MAGNETOSTRICTIVE TORQUE SENSOR (MAGNETIC ERASING)

(75) Inventor: Yasuo Shimizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/907,042

(22) Filed: Oct. 9, 2007

(65) Prior Publication Data

US 2008/0134803 A1    Jun. 12, 2008

(30) Foreign Application Priority Data

Oct. 10, 2006    (JP) .............................. 2006-276564

(51) Int. Cl.
*G01L 3/02* (2006.01)
(52) U.S. Cl. ................................. 73/862.333
(58) Field of Classification Search ...............................
73/862.331–862.333
See application file for complete search history.

(56) References Cited

U.S. PATENT DOCUMENTS

| | | | |
|---|---|---|---|
| 3,626,255 A * | 12/1971 | Littwin ........................ 361/149 |
| 4,811,609 A * | 3/1989 | Nishibe et al. .......... 73/862.333 |
| 5,146,790 A * | 9/1992 | Fish ....................... 73/862.336 |
| 5,322,487 A | 6/1994 | Nagano |
| 6,165,095 A * | 12/2000 | Till et al. ..................... 475/150 |
| 6,422,095 B1 | 7/2002 | Shimizu et al. |
| 6,595,074 B2 | 7/2003 | Shimizu |
| 7,308,835 B2 * | 12/2007 | Cripe ..................... 73/862.333 |
| 2007/0089538 A1 * | 4/2007 | Kashimura et al. ..... 73/862.331 |

FOREIGN PATENT DOCUMENTS

| | | |
|---|---|---|
| JP | 02-281116 | 11/1990 |
| JP | 05-65093 | 9/1993 |
| JP | 2001-133337 | 5/2001 |

* cited by examiner

*Primary Examiner*—Max Noori
(74) *Attorney, Agent, or Firm*—Arent Fox LLP

(57) ABSTRACT

A magnetostrictive torque sensor includes a magnetostrictive portion provided on a shaft. At least one torque detection coil is disposed opposite the shaft. The at least one torque detection coil detects a torque applied to the shaft. A demagnetization circuit (C) demagnetizes the shaft via the detecting coil.

14 Claims, 7 Drawing Sheets

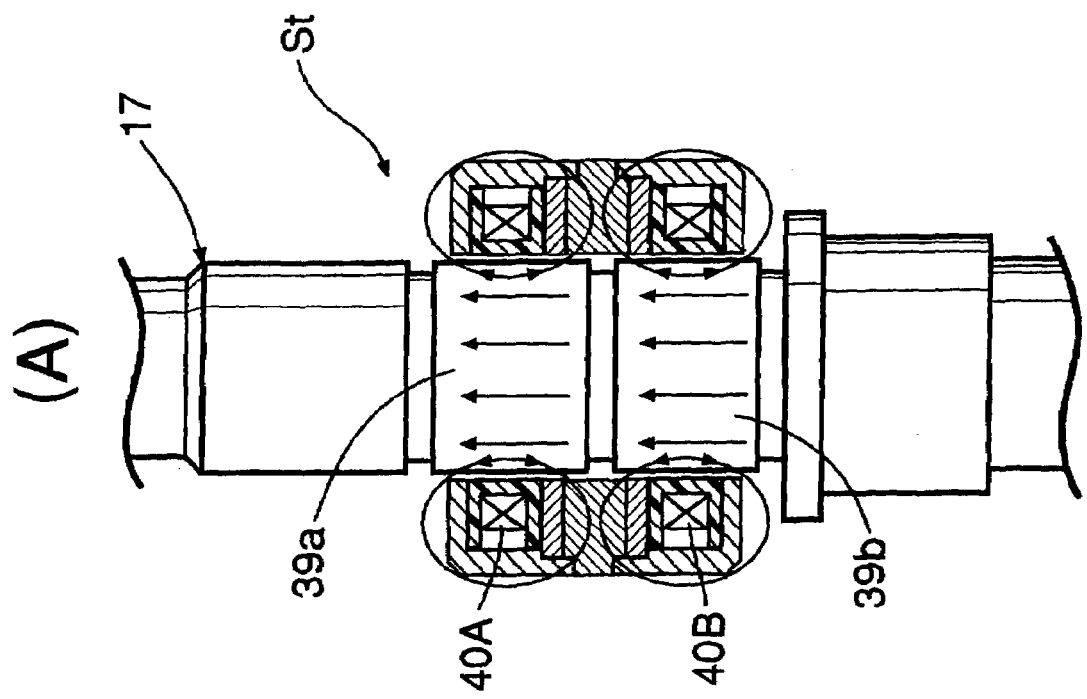
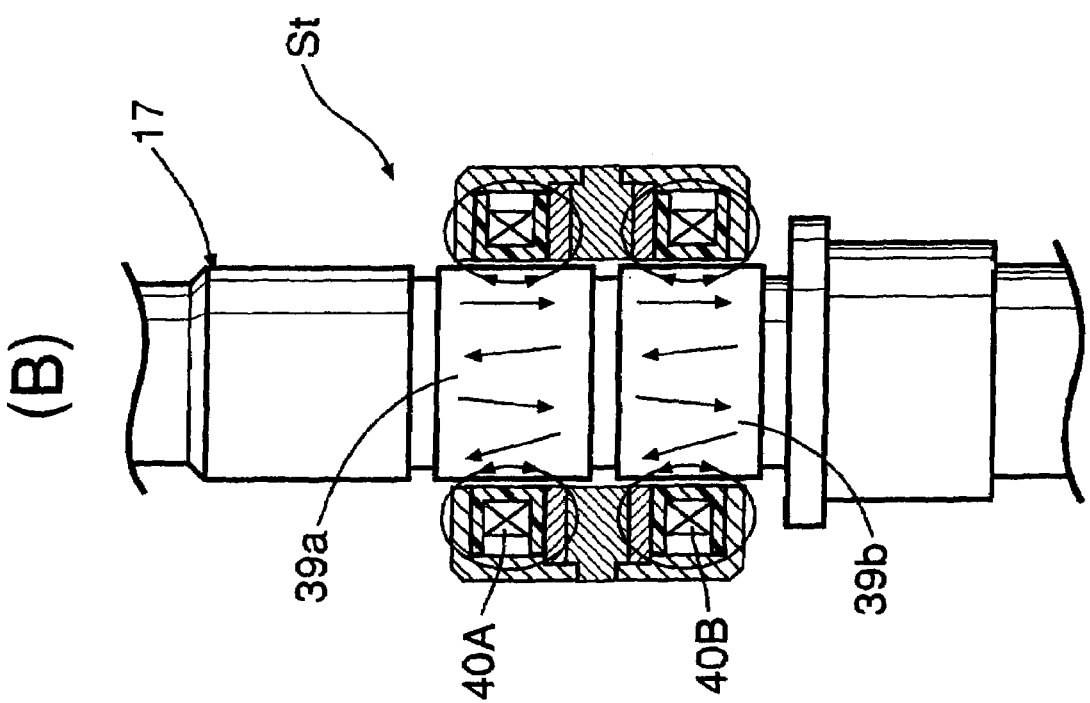

MAGNETOSTRICTIVE TORQUE SENSOR (MAGNETIC ERASING)

BACKGROUND OF THE INVENTION

1. Field of the Invention

The present invention relates to a magnetostrictive torque sensor which detects torque based on a change in magnetic characteristics resulting from a magnetostriction. The magnetostrictive torque sensor includes a shaft having a magnetostrictive film provided thereon, coils which surround the shaft, and a torque detecting device which detects a change in magnetic characteristics that occur when a rotational torque is applied to the shaft.

2. Description of Related Art

JP2001-13337 discloses a steering torque sensor of an electric power steering apparatus which detects a steering torque applied to a steering wheel. The steering torque sensor detects the steering torque using the measured inductance variation of the coils which results from a change of the permeability of the magnetostrictive film that corresponds to a rotational torque of the shaft.

When the shaft of a steering torque sensor is magnetized, a magnetic characteristic of the shaft changes and the accuracy in torque detection decreases. Therefore, there is a need to erase the magnetization of the shaft. Magnetostriction is a well-known property of ferromagnetic materials that changes the shape of the materials due to stress or torque, wherein a magnetic field is changed. An example of such a magnetic material is Ni—Fe. The magnetostriction of the shaft is known to be erased by providing an alternate current provided to magnetic erasing coils surrounding the shaft. However, since the steering torque detecting coils are already provided near or on the shaft, it is difficult to also arrange the magnetic erasing coils and the torque detecting coils on the shaft. Even if the magnetic erasing coils and the steering torque detecting coils are arranged, respectively, on the shaft, the overall size of the magnetostrictive torque sensor will undesirably increase and the overall construction of the torque sensor will become complex.

SUMMARY OF THE INVENTION

The present invention was attained by the inventor to solve the above-described problems and is intended to provide a mechanism capable of erasing the magnetostriction of (or demagnetizing) the shaft, wherein the mechanism accomplishes such while having a relatively simple structure.

In the following description, the herein described pinion shaft corresponds to the shaft, the herein described first and second magnetostrictive films correspond to the magnetostrictive film, the herein described first and second detection coils correspond to the torque detecting coils, the herein described transistors correspond to an alternate current generator, and the herein described transistor corresponds to a switch.

According to a first aspect of the invention, deterioration in torque detecting accuracy is prevented by demagnetizing the shaft using a magnetic erasing circuit. Also, the present invention results in a fewer number of parts and a more simple structure than conventional systems, wherein at least one demagnetization coil is added. Further, a switch is used to alternate between actuation of the torque detecting device and the magnetic erasing circuit to prevent the possibility of mutual influence between the torque detecting device and the magnetic erasing circuit.

According to a second aspect of the invention, demagnetization is performed by the magnetic erasing circuit when the shaft is magnetized, wherein demagnetization is only performed when necessary.

According to a third aspect of the invention, the magnetic erasing circuit is prevented from operating when the torque detecting device is operating. Therefore, torque detection is not affected by the magnetic erasing circuit.

According to a fourth aspect of the invention, the magnetic erasing circuit includes an alternate current generator and an electric charge maintaining device. The alternate current generator supplies an electric charge, which is discharged by the electric charge maintaining device, to the coils as an alternate current. A constant charge from the electric charge maintaining device ensures proper demagnetization.

According to a fifth aspect of the invention, the alternate current generator is a battery which provides an alternate current to the torque detection coils. Therefore, the present invention requires fewer parts and an overall simpler structure compared to the conventional technique of having to add a battery to perform torque detection.

According to a sixth aspect of the invention, the torque sensor is provided as a steering torque sensor of an electric power steering apparatus, and the torque sensor provides improved torque detection accuracy and more precise control of the electric power steering apparatus.

The preferred embodiment of the present invention will be explained with reference to the attached drawings.

BRIEF DESCRIPTION OF DRAWINGS

FIG. 6A shows a magnetized shaft;

FIG. 6B shows a demagnetized shaft; and

DETAILED DESCRIPTION OF PREFERRED EMBODIMENT

Figure 1:
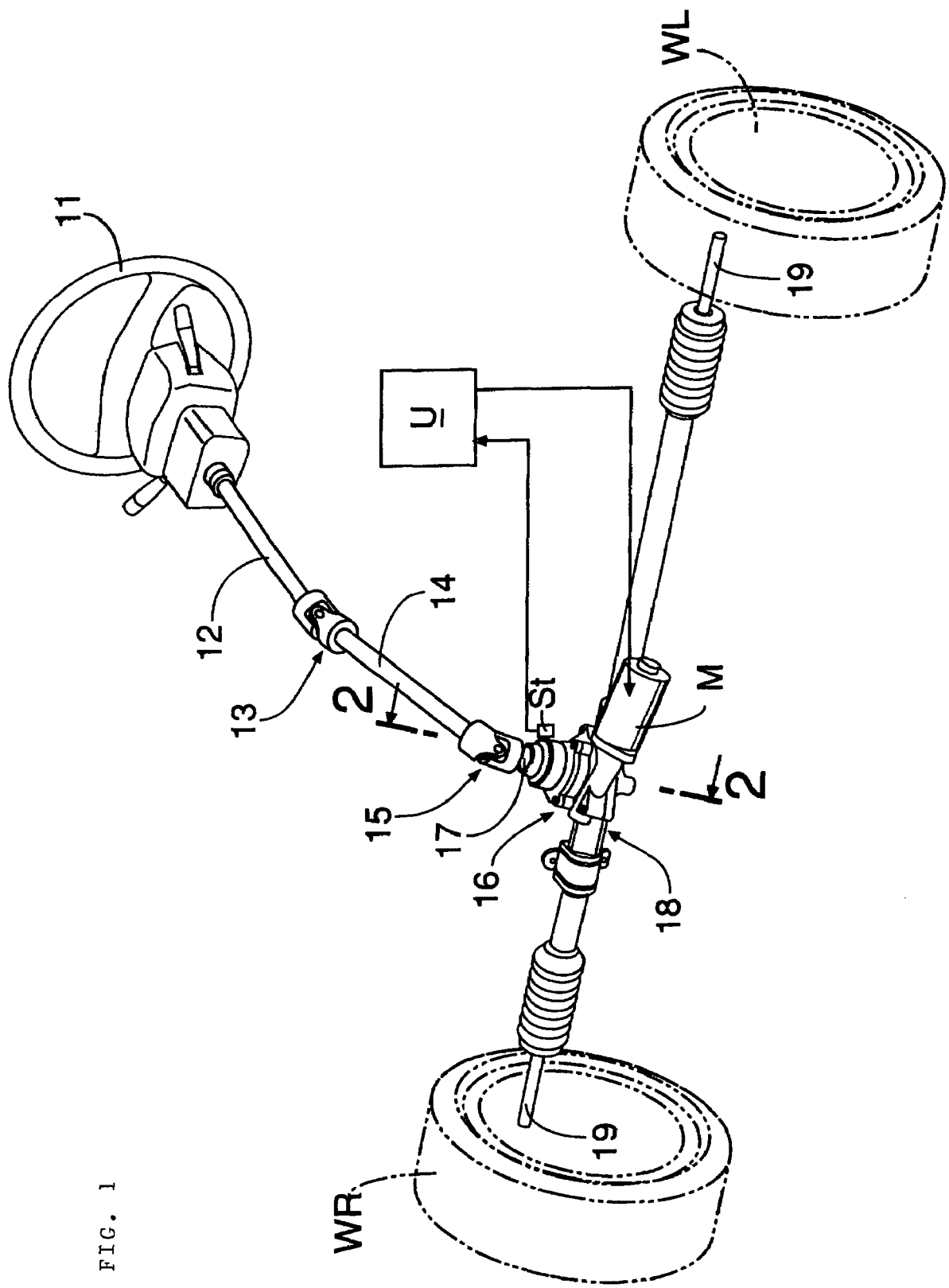
FIG. 1 is a perspective view of an electric power steering apparatus according to one embodiment of the present invention.

As shown by FIG. 1, an upper steering shaft 12 is rotatably connected to a steering wheel 11 and is also connected to a pinion shaft 17, which projects upwardly from a speed reduction mechanism 16 via an upper universal joint 13; a lower steering shaft 14; and a lower universal joint 15. Tie rods 19, which project from left and right ends of a steering gear box 18 disposed on the lower end of the speed reduction mechanism 16, are coupled to knuckles (not shown) of the right and left wheels WR and WL. The speed reduction mechanism is connected to a rotary shaft 34 of the motor M which is operated by an electric control unit U accommodated in the speed reduction mechanism 16.

Figure 2:
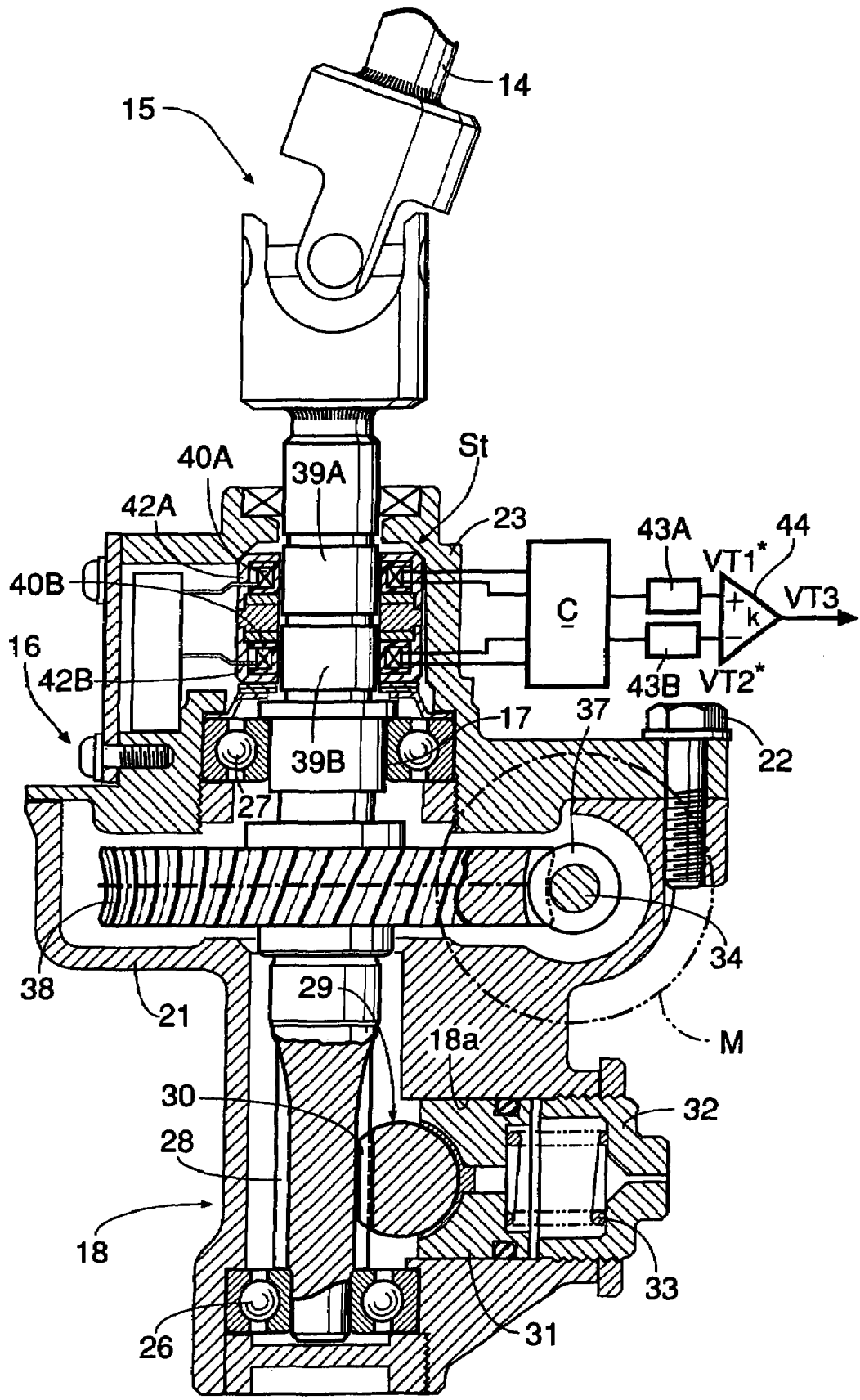
FIG. 2 is a cross-sectional view of line 2-2 in FIG. 1.

As shown by FIG. 2, the speed reduction mechanism 16 includes a lower case 21 integrally formed with a steering gear box 18. An upper case 23 is disposed on a top surface of the lower case 21, wherein the lower and upper cases 21, 23 are joined together by bolts 22. The pinion shaft 17 is rotatably supported by the steering gear box 18 and the upper case 23 by ball bearings 26, 27. A pinion 28 is provided at a lower end of the pinion shaft 17 and meshes with the rack 30 of a rack bar 29. The rack bar 29 is capable of a reciprocating motion within the steering gear box 18 in a width direction of the vehicle. A press member 31 is slidably accommodated in a through-bore 18*a* defined within the steering gear box 18. The pinion 28 meshes with the rack 30 without unnecessary play via a spring 33 provided between the press member 31 and a nut member 32. It should be noted that the nut member 32 also closes an opening formed by the through-bore 18*a* and pushes the press member 31 toward a back side of the rack bar 29. A worm gear 37 provided in the rotary shaft 34 of the motor M expands inside of the speed reduction mechanism 16 and meshes with a worm wheel 38 fixed to the pinion shaft 17.

A steering torque sensor St provided in the upper case 23 detects a steering torque applied to the steering wheel 11. The steering torque sensor St includes the first and second magnetostrictive films 39A, 39B which include Ni—Fe-based alloy plating that covers a predetermined surface width of the pinion shaft 17. A first detection coil 40A surrounds the first magnetostrictive film 39A, and a second detection coil 40B surrounds the second magnetostrictive film 39B. A first yoke surrounds the first detection coil 40A, and a second yoke surrounds the second detection coil 40B. The first and second detection coils 40A, 40B are connected to a magnetic erasing circuit C which demagnetizes (or erases the magnetized state of) the pinion shaft 17. The magnetic erasing circuit C is connected to the first and second output select circuit 43A, 43B and a differential amplification circuit 44. Further, the magnetic erasing circuit C provides an excitation function to the first and second detection coils 40A, 40B for detection of a steering torque.

Figure 3:
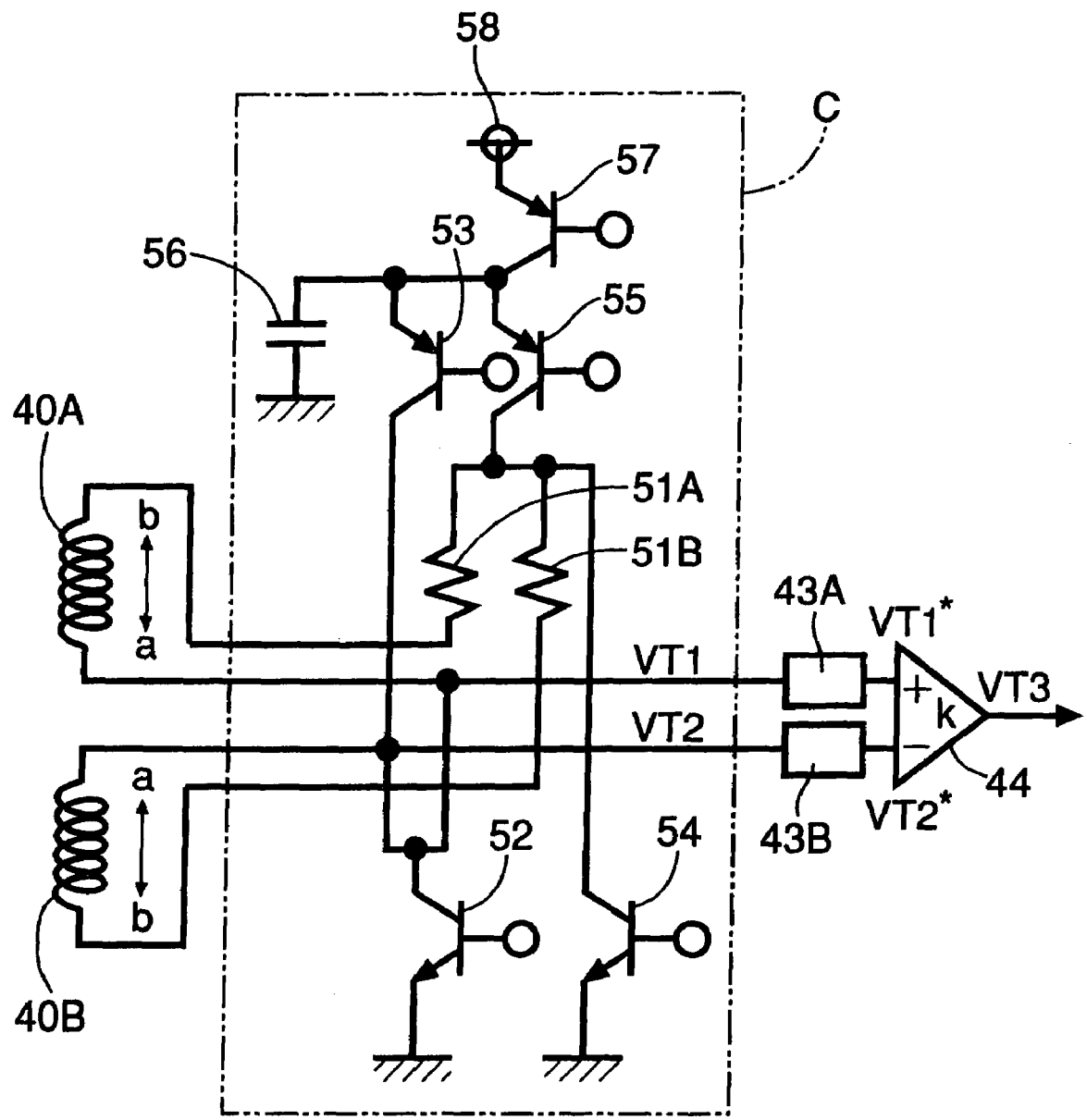
FIG. 3 is a schematic diagram of a magnetic erasing circuit.

Next, referring to FIG. 3, a structure of the magnetic erasing circuit C will be explained.

One end of the first detection coil 40A is connected to a first resistor 51A, and the other end of the first detection coil 40A is connected to a collector terminal of an NPN-type transistor 52, as well as a first output select circuit 43A. One end of the second detection coil 40B is connected to a second resistor 51B, and the other end of the second detection coil 40B is connected to a collector terminal of a PNP-type transistor 53, as well as a second output select circuit 43B. An end of the first resistor 51A and an end of the second resistor 51B are connected to the collector terminal of a NPN-type transistor 54 and to a collector terminal of a PNP-type transistor 55. The collectors of both transistors 53 and 55 are connected to an end of a relatively large capacity condenser 56 and to a PNP-type transistor 57. One end of the condenser 56 is connected to ground, and the other end is connected to an emitter terminal of the PNP-type transistor 57 which itself is connected to a battery 58 that provides a constant voltage (e.g., 5V). An emitter terminal of the NPN-type transistors 52, 54 is connected to ground as well.

Next, an embodiment of the torque sensor of the present invention, which includes the above-described magnetic erasing circuit C, will be explained.

First, a conventional torque detecting function of the steering torque sensor St will be explained. For example, when an ignition switch is turned on, the PNP-type transistor 57 is also turned on, and the battery 58 is connected to the condenser 56 and the emitter terminals of both PNP-type transistors 53, 55. The condenser 56 is gradually charged until a voltage of the condenser 56 equals a voltage of the battery 58. When a voltage at each emitter terminal of the PNP-type transistors 53, 55 equals the voltage of the battery 58, for example, when the PNP-type transistor 55 and the NPN-type transistor 52 are ON at the same time, the PNP-type transistor 53 and the NPN-type transistor 52 are then turned ON, and the sequence of the operation is repeated at dozens of frequencies, so that an alternate current is supplied to the first and second detection coils 40A, 40B.

As such, when the alternate current is supplied to the first and second detection coils 40A, 40B, and a steering torque is input to the pinion shaft 17, an inductance L1 of the first magnetostrictive film 39A shifts to an inductance L1+ΔL, an inductance L2 of the second magnetostrictive film 39B shifts to an inductance L2−ΔL, and the differential inductance ΔL corresponds to the induced steering torque. As such, the first and second detection coils 40A, 40B detect the differential inductance ΔL.

That is to say, an output signal of the first detection coil 40A is converted to a voltage and defined as a first voltage signal VT1 by the first resistor 51A. An output signal of the second detection coil 40B is converted to a voltage and defined as a second voltage signal VT2 by the second resistor 51B, wherein the first and second output select circuits 43A, 43B clamp and maintain the first and second voltage signals VT1, VT2 as a rectifying circuit when the PNP-type transistor 55 and the NPN-type transistor 52 are ON. The first and second output signal select circuits 43A, 43B generate first and second voltage signals VT1*, VT2*, each of which correspond to the first and second voltage signals VT1, VT2, wherein the first and second voltage signals VT1*, VT2* are transmitted to a differential amplification circuit 44. Also, a third voltage signal VT3 (i.e., a torque detection signal), which corresponds to a steering torque, is calculated and output by the differential amplification circuit 44.

Figure 4A:
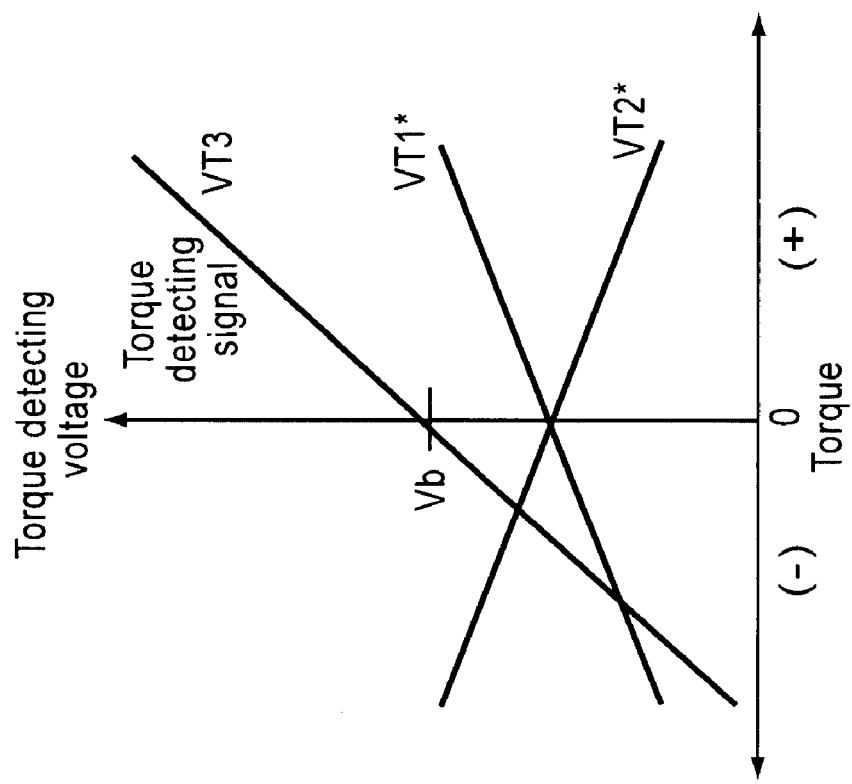
FIGS. 4(A) and 4(B) are schematic diagrams showing a torque detection signal of a steering torque.

As shown by FIG. 4(A), the differential amplification circuit 44 calculates the third voltage circuit signal VT3 (a torque detection signal) using a differential signal between the first voltage signal VT1* and the second voltage signal VT2*, such as (VT1*−VT2*) which is amplified by a gain k. When the steering torque increases, the first voltage signal VT1* increases, and the second voltage signal VT2* decreases. Accordingly, the third voltage signal VT3 will increase in proportion to an increase of the steering torque. The third voltage signal VT3 is set to a predetermined bias voltage Vb (e.g., 2.5V) when the steering torque is zero and is calculated based on equation (I):

$$VT3 = k(VT1^* - VT2^*) = Vb \quad (I)$$

As such, when a steering torque is applied to the steering wheel 11, the pinion shaft 17 is rotated with the first and second magnetostrictive films 39A and 39B provided thereon. Following this, a magnetic flux density generated along magnetic paths formed by the first and second magnetostrictive films 39A, 39B and the first and second yokes 42A, 42B is changed and a steering torque is detected based on a variation of the generated magnetic flux density.

Figure 4B:
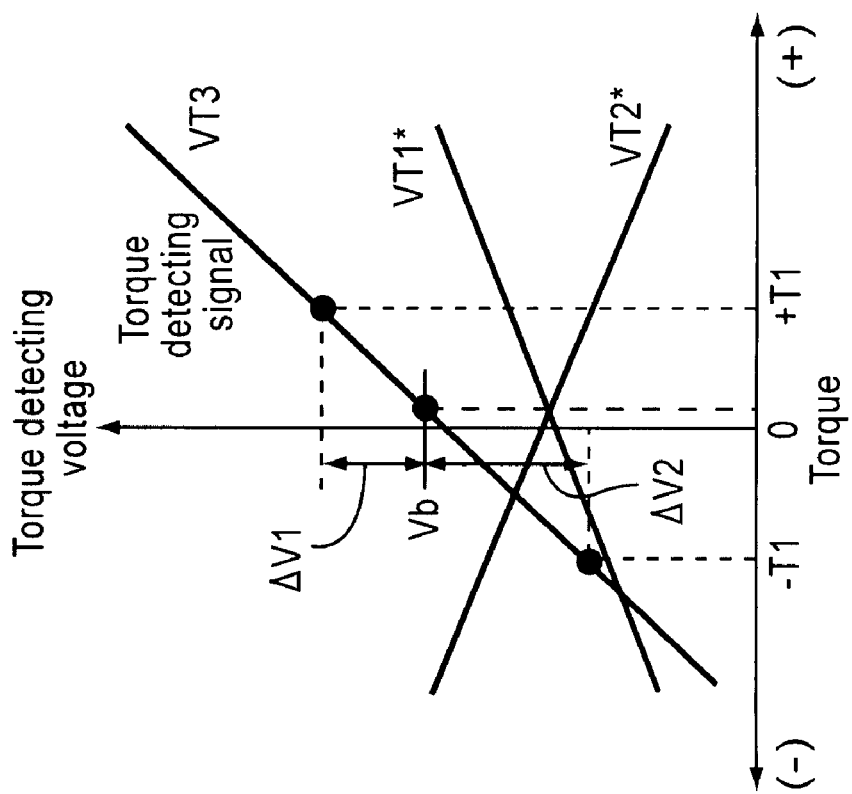

As shown in FIG. 4 (A), the first voltage signal VT1* equals the second voltage signal VT2*, and the third voltage signal VT3 corresponds to the predetermined bias voltage Vb when the steering torque is equal to zero. However, when the pinion shaft 17 includes magnetic films 39A, 39B, the pinion shaft 17 is magnetized by a magnetic influence resulting from the magnetic force generated by the first and the second detection coils 40A and 40B during torque detection. Under this condition, the first voltage signal VT1* is not the same as the second voltage signal VT2*, and the third voltage signal VT3 is shifted from the predetermined bias voltage Vb when the steering torque is zero.

As shown by FIG. 4 (B), when the steering torque takes a value of +T1, a differential between the third voltage signal VT3 (i.e., a torque detecting signal) and the predetermined bias voltage Vb is a value of ΔV1. However, when the steering torque takes a value of −T1, a differential between the third voltage signal VT3 and the predetermined bias voltage Vb is a value of ΔV2. As such, even though +T1 and −T1 have the same absolute value, the resulting differential values ΔV1 and ΔV2 are not equal. As a result, inaccurate torque detection values will occur and result in poor steering performance.

The present invention cancels the disaccord between the first and second voltage signals VT1* and VT2* by erasing the magnetized pinion shaft 17 using the magnetic erasing circuit C.

The following description explains how the pinion shaft 17 is demagnetized by the magnetic erasing circuit C.

The magnetic erasing circuit C supplies the alternate current to the first and second detection coils 40A, 40B when a steering torque is detected which demagnetizes the pinion shaft 17. Accordingly, the magnetic erasing circuit C cannot work when a torque is detected. Therefore, the magnetic erasing circuit C works when the vehicle is stopped (i.e., velocity is substantially zero), when a steering torque is substantially zero, and when the pinion shaft 17 is magnetized.

Magnetization, for example, is based on the torque detecting signal VT3 and whether the signal VT3 is in accordance with the predetermined bias voltage Vb while the steering wheel is not being manipulated. As such, the magnetic erasing process is stopped when the steering wheel is being manipulated.

Figure 5:
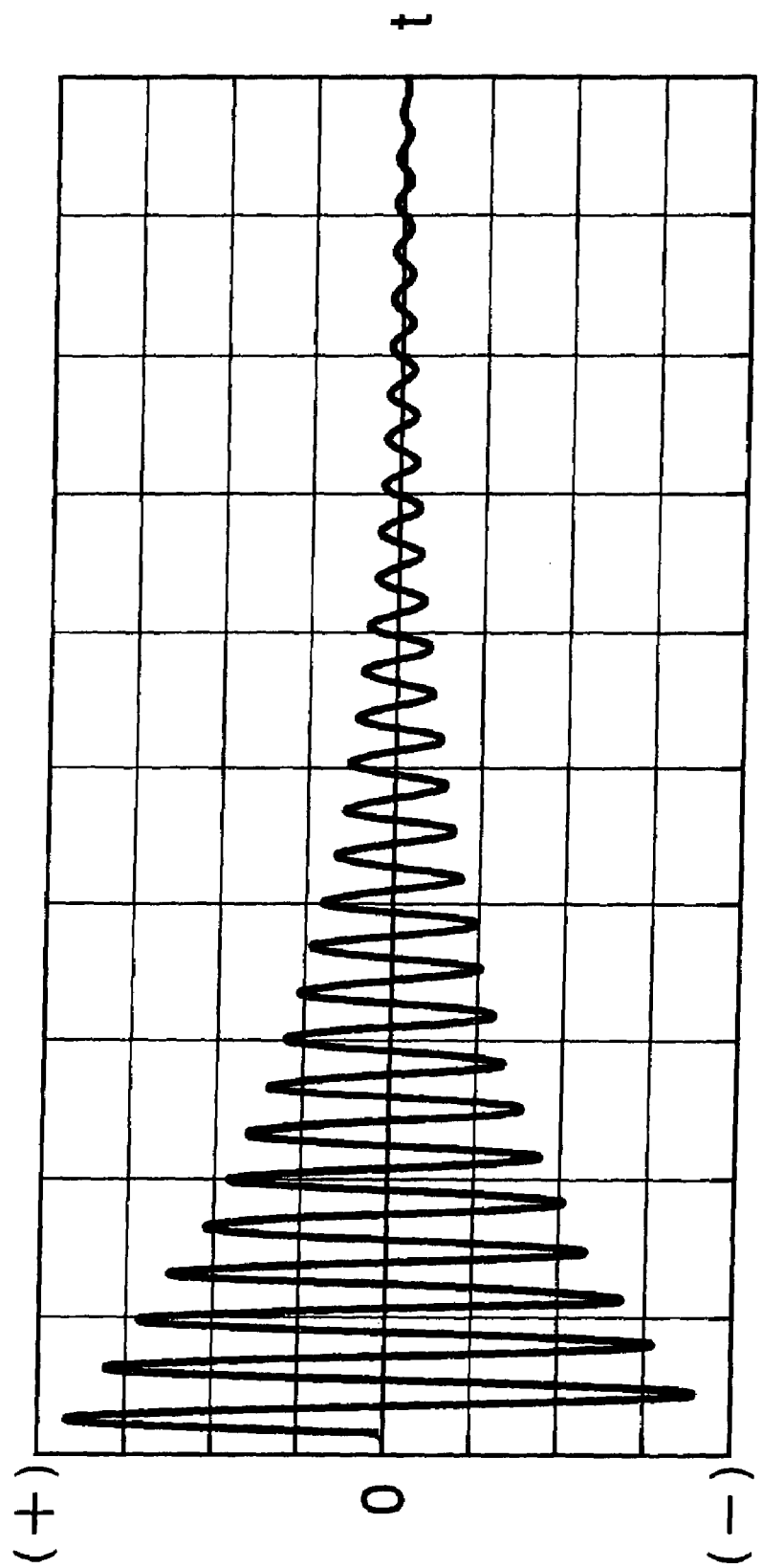
FIG. 5 shows an alternate current wave generated by a charge from a condenser.

At first, when in a condition wherein the condenser 56 is fully charged, the PNP-type transistor 57 is turned OFF. The PNP-type transistor 55 and NPN-type transistor 52, which are provided on a first diagonal line, and the PNP-type transistor 53 and the NPN-type transistor 54, which are provided on a second diagonal line, are alternately switched ON and OFF, and the condenser 56 supplies an alternate current to the first and second detection coils 40A, 40B. Thus, the PNP-type transistor 55 and the NPN-type transistor 52, which are provided on the first diagonal line, are turned ON at the same time and a current is generated. The current passes through the first and second detection coils 40A, 40B in a direction "a" (FIG. 3). In contrast, when the PNP-type transistor 53 and the NPN-type transistor 54, which are provided on the second diagonal line, are turned ON at the same time, a current is generated and passes through the first and second detection coils 40A, 40B in a direction "b" (FIG. 3). As shown by FIG. 5, the alternate current gradually diminishes in accordance with a deterioration in the charge of the condenser 56.

Thus, as shown by FIG. 6(A), the first and second detection coils 40A and 40B are supplied with an alternate current generated by a charge of the condenser 56, such that the pinion shaft 17 is magnetized in a same or common direction which changes to a random direction resulting from the demagnetization (FIG. 6(B)). As such, any differences between the first and second voltage signals of VT1* and VT2* are eliminated, wherein a steering torque detecting accuracy is improved.

Figure 7:
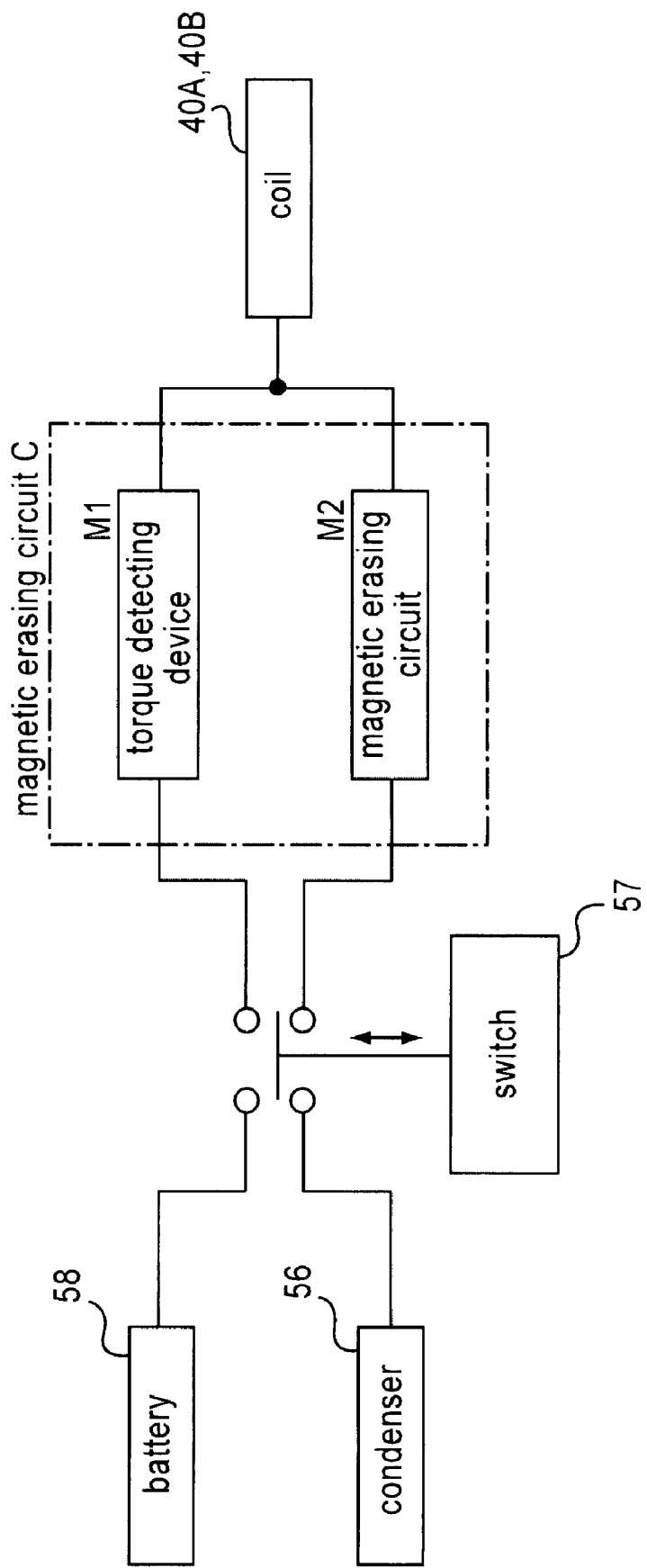
FIG. 7 is a schematic diagram of a magnetic erasing circuit supplying alternating currents to torque detecting coils.

As shown by FIG. 7, the magnetic erasing circuit C includes a torque detecting device M1, which supplies an alternate current to the first and second detection coils 40A and 40B in order to detect a steering torque, and a magnetic erasing circuit M2, which supplies an alternate current to the first and second detection coils 40A and 40B in order to demagnetize the pinion shaft 17. The torque detecting device M1 and the magnetic erasing circuit M2 include four commonly used transistors 52-55, which can function as torque detectors and magnetic erasers because of different ON/OFF controls for each transistor. PNP transistors 57 selectively switch a connection between the battery 58 and the torque detecting device M1, and a connection between the condenser 56 and the magnetic erasing circuit M2.

According to the above-described structural configuration of the present invention, the first and second detection coils 40A and 40B provide torque detection and magnetic erasing. As such, the present invention reduces the overall number of parts and simplifies the structure compared with when a demagnetizing coil is included. Further, actuation of the torque detecting device M1 and the magnetic erasing circuit M2 is alternately switched by the transistor 57, such that a mutual influence between the torque detecting device M1 and the magnetic erasing circuit M2 is prevented. Also, the torque detecting device M1 and the magnetic erasing circuit M2 include four commonly used transistors 52-55, wherein parts of the magnetostrictive torque sensor are reduced and the structure of the magnetostrictive torque sensor is simplified compared with when the torque detecting device M1 and the magnetic erasing circuit M2 are assembled, respectively, with a demagnetizing coil.

In addition, unnecessary current consumption of the first detection coil 40A and second detection coil 40B is prevented due to the alternate actuation of the torque detecting device M1 and the magnetic erasing circuit M2.

Also, a constant charge of the condenser 56 effectively demagnetizes the pinion shaft 17, such that there is no need to provide another battery in addition to the existing battery 58.

Moreover, when the torque sensor St in the present invention is provided as a steering torque sensor of an electric power steering apparatus, accuracy of steering torque detection is improved, and controllability of the electric power steering apparatus is enhanced.

While the above-mentioned description has been made in connection with a particular embodiment of the present invention, it will be obvious to those skilled in the art that various changes and modifications may be made without departing from the spirit and scope of the present invention.

For example, another torque sensor instead of the described torque sensor St may be used for detecting a rotational torque.

Moreover, the present invention is not limited to the bridge circuit, which includes four transistors 52-55, as any other circuit can be substituted for the bridge circuit. Further, the alternate current is not limited to a pulse as the alternate current may take the form of a sine wave.

What is claimed is:

1. A magnetostrictive torque sensor comprising:

a magnetostrictive portion provided on a shaft;

first and second torque detection coils disposed opposite the shaft, wherein at least one first and second torque detection coil detects a torque applied to the shaft, a demagnetization circuit (C) demagnetizes the shaft via said at least one first and second torque detection coil, and the demagnetization circuit (C) provides an excitation function to said at least one first and second torque detection coil; and torque calculating means for calculating the detected torque, wherein the detected torque is calculated by an equation:

$$VT3 = k(VT1 - VT2) + Vb$$

wherein VT1 is a first voltage signal detected by the first torque detection coil facing a first magnetostrictive portion, and when the steering torque increases, the first voltage signal increases, and wherein VT2 is a second voltage signal detected by the second torque detection coil facing a second magnetostrictive portion, and when the steering torque increases, the first voltage signal decreases, and Vb is a bias voltage.

2. The magnetostrictive torque sensor according to claim 1, wherein the demagnetization circuit (C) generates and transmits a decreasing signal to said at least one first and second torque detection coil.

3. The magnetostrictive torque sensor according to claim 1, wherein the demagnetization circuit (C) comprises an alternate current generator which includes a plurality of switching elements and a plurality of resistor elements.

4. The magnetostrictive torque sensor according to claim 1, wherein the demagnetization circuit (C) is provided with an electric current by at least one charge maintaining device.

5. The magnetostrictive torque sensor according to claim 1, wherein the demagnetization circuit (C) stops demagnetizing the shaft while the torque is being detected.

6. The magnetostrictive torque sensor according to claim 1, wherein the shaft is a steering shaft of a vehicle.

7. The magnetostrictive torque sensor according to claim 6, wherein the demagnetization circuit (C) supplies a demagnetizing signal to the steering shaft when a velocity of the vehicle is substantially zero.

8. The magnetostrictive torque sensor according to claim 6, wherein the demagnetization circuit (C) supplies a demagnetizing signal to the steering shaft while a steering torque is substantially zero.

9. The magnetostrictive torque sensor according to claim 4, wherein the at least one charge maintaining device is a condenser.

10. The magnetostrictive torque sensor according to claim 1, wherein the demagnetization circuit (C) comprises a bridge circuit having a plurality of transistors.

11. A magnetostrictive torque sensor comprising:
a magnetostrictive portion provided on a shaft;
first and second torque detection coils disposed opposite the shaft,
wherein at least one first and second torque detection coil detects a torque applied to the shaft,
a demagnetization circuit (C) demagnetizes the shaft via said at least one first and second torque detection coil, and a magnetization of one of the magnetostrictive portion and the shaft is detected based on a torque detecting signal; and
torque signal calculating means for calculating the detected torque, wherein the detected torque is calculated by an equation:

$$VT3 = k(VT1 - VT2) + Vb$$

wherein VT1 is a first voltage signal detected by the first torque detection coil facing a first magnetostrictive portion, and when the steering torque increases, the first voltage signal increases, and wherein VT2 is a second voltage signal detected by the second torque detection coil facing a second magnetostrictive portion, and when the steering torque increases, the first voltage signal decreases, and Vb is a bias voltage.

12. The magnetostrictive torque sensor according to claim 11, wherein the demagnetization circuit (C) comprises a bridge circuit having a plurality of transistors.

13. A magnetostrictive torque sensor according to claim 11, wherein the demagnetization is detected when a velocity of a vehicle in which the sensor is mounted is substantially zero.

14. A magnetostrictive torque sensor according to claim 11, wherein the demagnetization is detected while a steering torque is substantially zero.

* * * * *